(12) United States Patent
Brown et al.

(10) Patent No.: US 7,672,638 B1
(45) Date of Patent: *Mar. 2, 2010

(54) GEOSYNCHRONOUS SATELLITE CONSTELLATION

(75) Inventors: David M. Brown, Upper Makefield, PA (US); Anthony W. Jacomb-Hood, Yardley, PA (US)

(73) Assignee: Lockheed Martin Corporation, Bethesda, MD (US)

(*) Notice: Subject to any disclaimer, the term of this patent is extended or adjusted under 35 U.S.C. 154(b) by 1339 days.

This patent is subject to a terminal disclaimer.

(21) Appl. No.: 11/080,423

(22) Filed: Mar. 16, 2005

(51) Int. Cl.
*H04B 7/185* (2006.01)
(52) U.S. Cl. .................... 455/12.1; 455/427; 455/13.2; 455/428
(58) Field of Classification Search .................... 455/69, 455/3.02, 427, 429, 430, 456.1, 12.1, 13.2, 455/13.3, 13.1, 428, 63.1, 67.11; 342/359, 342/339; 370/316, 311
See application file for complete search history.

(56) References Cited

U.S. PATENT DOCUMENTS

| | | | |
|---|---|---|---|
| 6,019,318 A | 2/2000 | Cellier et al. | |
| 6,126,116 A | 10/2000 | Cellier | |
| 6,223,019 B1 * | 4/2001 | Briskman et al. | .......... 455/12.1 |
| 6,714,521 B2 * | 3/2004 | Draim | .......... 370/316 |
| 6,825,807 B1 * | 11/2004 | McKinnon | .......... 342/359 |
| 6,954,613 B1 | 10/2005 | Castiel et al. | |
| 2002/0017593 A1 * | 2/2002 | Castiel et al. | .......... 244/158 R |
| 2003/0155468 A1 * | 8/2003 | Goodzeit | .......... 244/158 R |
| 2006/0192056 A1 * | 8/2006 | Castiel et al. | .......... 244/158.4 |
| 2006/0240767 A1 * | 10/2006 | Jacomb-Hood et al. | .... 455/12.1 |
| 2006/0276128 A1 | 12/2006 | Castiel et al. | |

FOREIGN PATENT DOCUMENTS

| | | |
|---|---|---|
| WO | WO 01/56881 A1 | 8/2001 |
| WO | WO 01/91310 A2 | 11/2001 |
| WO | WO 03/071308 A2 | 8/2003 |

* cited by examiner

*Primary Examiner*—John Lee
(74) *Attorney, Agent, or Firm*—McDermott Will & Emery LLP

(57) ABSTRACT

A satellite communications system is described for increasing capacity through spectrum reuse by multiple satellites. The system includes a constellation of satellites traveling in a geosynchronous orbit, where the geosynchronous orbit defines a ground track. The satellites operate in a first mode when traveling in a first latitudinal direction on the satellite track and in a second mode when traveling in a second latitudinal direction on the satellite track. By using different operation modes, satellites traveling in opposite latitudinal directions do not interfere with each other. Each of the satellites maintains a minimum spacing apart from other satellites moving in the same latitudinal direction to prevent interference from satellites using the same operation mode.

38 Claims, 5 Drawing Sheets

GEOSYNCHRONOUS SATELLITE CONSTELLATION

STATEMENT REGARDING FEDERALLY SPONSORED RESEARCH OR DEVELOPMENT

Not Applicable to this Invention.

FIELD OF THE INVENTION

The present invention concerns a satellite communications system, and in particular concerns a satellite communications system using a geosynchronous satellite constellation that provides increased frequency spectrum reuse.

BACKGROUND OF THE INVENTION

Satellites play an important role in modern communications systems. Common communications such as telephone calls and television programming are transmitted and received using satellite communications systems. Communications satellites are typically placed in geostationary orbits around the Earth. However, limited frequency spectrum and insufficient orbital locations are impeding the expansion of satellite communications services. This problem is particularly severe over areas such as North America and Europe.

Required satellite spacing creates a limited number of geostationary orbital locations. Satellites using common portions of the frequency spectrum must be spaced far enough apart to prevent interference with adjacent satellites. This spacing is commonly quantified in degrees of angular spacing as measured from the center of the Earth. For example, direct broadcast satellites (DBS) typically require at least 9 degrees of angular spacing, while fixed satellite service (FSS) typically requires at least 2 degrees of angular spacing between adjacent satellites. As the required spacing increases, the number of available orbital locations decreases. High-demand areas, such as North America and Europe, have an insufficient number of available geostationary orbital locations to meet future communications needs.

As available orbital locations are filled with satellites, the amount of frequency spectrum allocated for use by the satellites becomes a second factor limiting the expansion of satellite communications. The International Telecommunication Union (ITU) has allocated portions of the frequency spectrum for use in satellite communications. Satellite communications systems currently use the C-band, the Ku-band, and/or the Ka-band of the frequency spectrum. The amount of data transmitted and/or received by a satellite is limited to the bandwidth provided by these frequency bands. Once the available bandwidth has been used, other solutions must be devised to provide additional communications capacity.

Accordingly, a need exists for a satellite communications system that can provide sufficient capacity to meet future communications needs. Such a system must provide the additional communications capacity while taking into account the limitations imposed by available orbital locations and allocated frequency spectrum.

SUMMARY OF THE INVENTION

The present invention concerns a geosynchronous satellite communications system that addresses the foregoing problems found in conventional geostationary satellite communications systems. The system includes a geosynchronous constellation of satellites in communication with one or more ground terminals. The geosynchronous orbit of the satellites defines an elongated satellite track in which the North/South excursion is greater than the East/West excursion. A North/South excursion is selected which allows satellites traveling in the same latitudinal direction to be spaced far enough apart to reuse frequency spectrum without interference. An East/West excursion is selected to be narrow enough to occupy a single geostationary orbital location and to allow ground terminals to track the satellites by scanning predominantly in a single plane. To prevent interference between satellites traveling in opposite latitudinal directions, the satellites switch between two operating modes depending on their latitudinal direction of travel. In this manner, the invention increases communications capacity without requiring additional geostationary orbital locations or a larger frequency spectrum allocation.

According to one aspect, the invention concerns a satellite constellation that includes multiple satellites traveling in a geosynchronous orbit, which defines a satellite track. Each of the satellites operates in a first mode when traveling in a first latitudinal direction on the satellite track and in a second mode when traveling in a second latitudinal direction on the satellite track. Additionally, satellites traveling in the first latitudinal direction maintain a minimum spacing apart from one another and satellites traveling in the second latitudinal direction maintain a minimum spacing apart from each other.

Preferably, the satellite track followed by the satellites is elongated with the latitudinal excursion being greater than the longitudinal excursion of the satellite track. It is also preferable that the first mode of operation uses a first frequency sub-band and the second mode of operation uses a second frequency sub-band different from the first.

According to another aspect, the invention concerns a satellite communications system that includes multiple satellites traveling in a geosynchronous orbit and a ground terminal for communicating with at least one of the satellites. The geosynchronous orbit defines a satellite track and the satellites operate in a first mode when traveling in a first latitudinal direction on the satellite track and in a second mode when traveling in a second latitudinal direction on the satellite track. Satellites traveling in the first latitudinal direction maintain a minimum spacing apart from one another and satellites traveling in the second latitudinal direction also maintain a minimum spacing apart from one another.

Preferably, the ground terminal includes an antenna system for selectively steering beams, and nulls, at one or more of the satellites. Preferably, the antenna system includes a multi-beam phased array antenna, a multi-beam reflector antenna or a mechanically steered antenna for selectively tracking the satellites. In one embodiment of the invention, the longitudinal excursion of the satellite track is within a usable beam width of the antenna system, thereby allowing the beams to be steered in a single plane.

Preferably, each of the satellites includes a satellite antenna system for steering a beam at a particular service region. The satellite antenna system can include a multi-beam phased array antenna, a multi-beam reflector antenna or a mechanically steered antenna. The beam is optionally shaped to maintain a footprint over a particular service region.

The foregoing summary of the invention has been provided so that the nature of the invention can be understood quickly. A more detailed and complete understanding of the preferred embodiments of the invention can be obtained by reference to the following detailed description of the invention together with the associated drawings.

DETAILED DESCRIPTION OF THE INVENTION

The present invention improves the data capacity of a satellite communications system by utilizing a constellation of satellites flying in a geosynchronous orbit. The invention combines spatial separation and signal separation between the satellites to allow multiple satellites to reuse allocated frequency spectrum without interference. The geosynchronous orbit is configured for the satellite constellation to fly over a single geostationary orbital location and not interfere with satellites flying in adjacent geostationary orbital locations. In this manner, the data capacity previously provided by a single geostationary satellite is vastly improved by using a geosynchronous satellite constellation.

Figure 1:
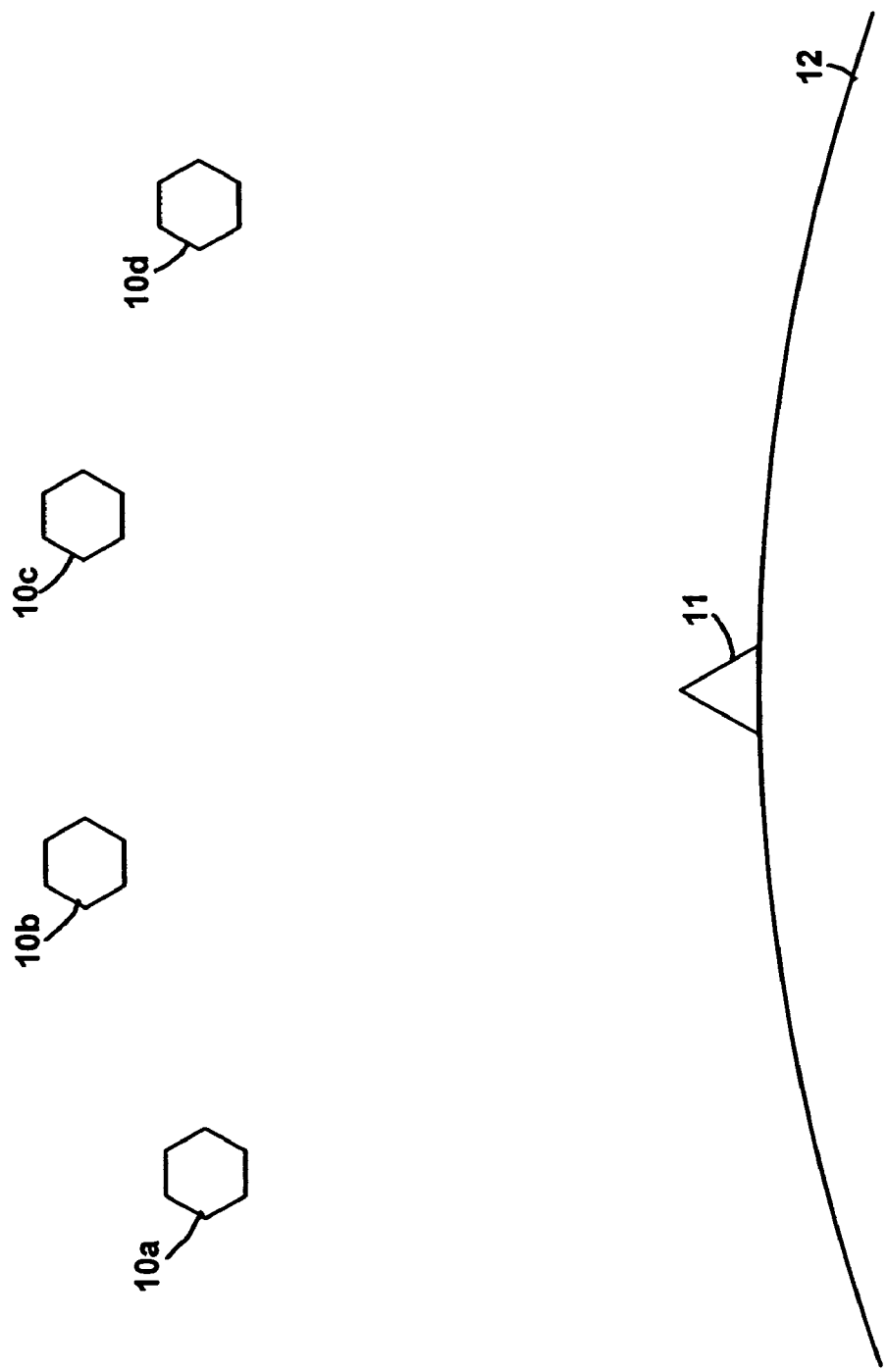
FIG. 1 is a diagram depicting the basic components of a satellite communications system according to the invention.

FIG. 1 is a diagram depicting the basic components of a satellite communications system according to one embodiment of the invention. The satellite communications system includes four satellites 10a to 10d and a ground terminal 11 located on the surface 12 of the Earth. Satellites 10a to 10d orbit the Earth in a geosynchronous orbit and are in communication with ground terminal 11. The system depicted in FIG. 1 includes four satellites and a single ground terminal. The invention is not limited to this configuration, however, and can be implemented with different numbers of both satellites and ground terminals without departing from the scope of the invention. In addition, ground terminal 11 is not limited to a terminal in a fixed location on the Earth and can be implemented on a vehicle capable of travel on land, sea or air.

Figure 2:
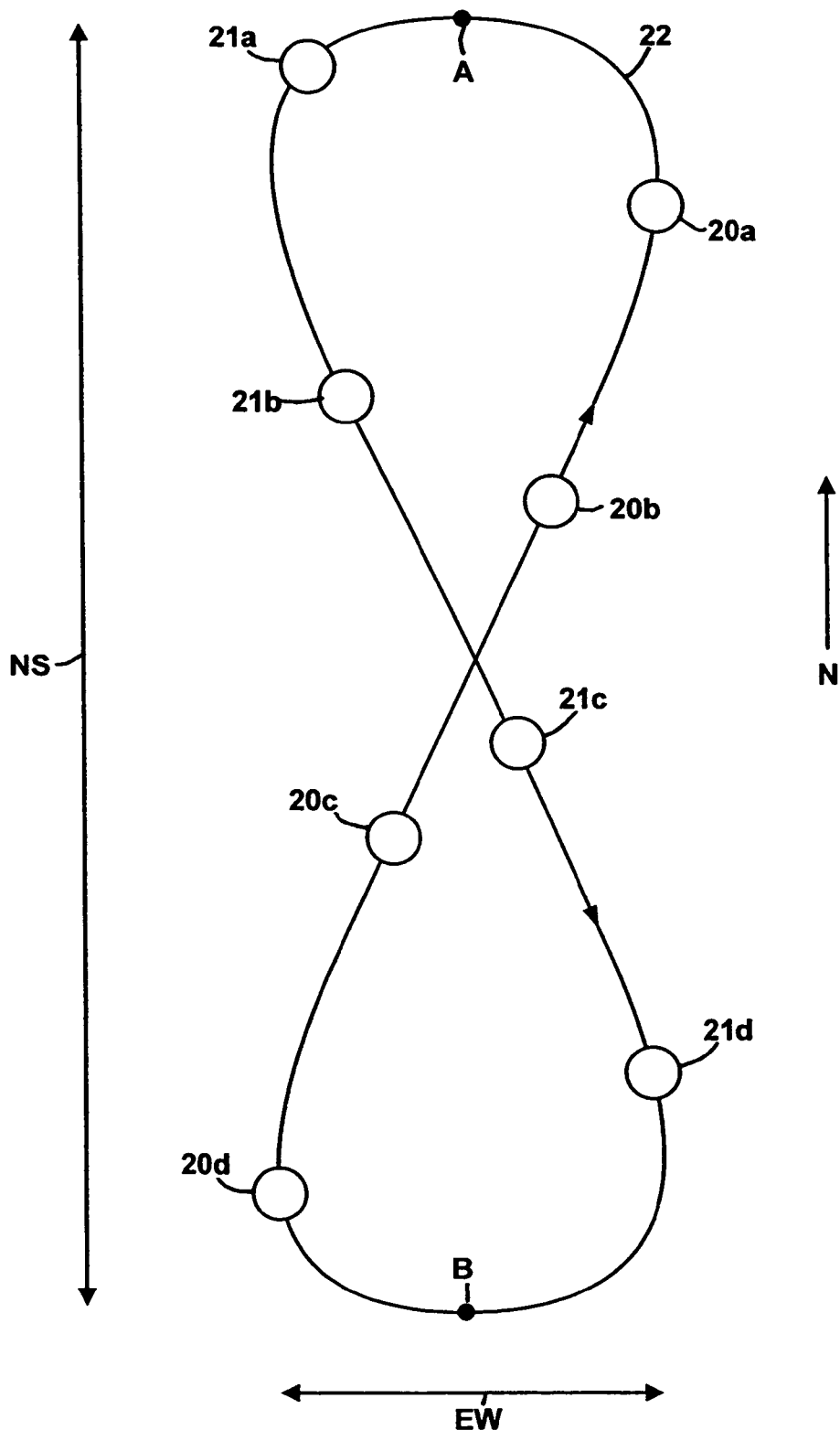
FIG. 2 is a diagram depicting a satellite track of a geosynchronous orbit according to one embodiment of the invention.

A geosynchronous orbit defines a satellite track on the surface of the Earth. The satellite track represents the track of a satellite in a geosynchronous orbit as viewed from the surface of the Earth. The track is created from a series of points representing locations where a line extending from the center of the Earth to the satellite intersects the surface of the Earth as the satellite travels through the geosynchronous orbit. FIG. 2 is a diagram depicting the satellite track of a geosynchronous satellite constellation according to one embodiment of the invention.

The satellite constellation depicted in FIG. 2 includes eight satellites 20a to 20d and 21a to 21d. The satellite constellation communicates with one or more ground terminals using an allocated band of the frequency spectrum. The particular frequency band used by the satellite communications system is not important for purposes of the invention and therefore any frequency band allocated for satellite communications can be used without departing from the scope of the invention. The invention allows multiple satellites within the constellation to reuse the allocated frequency band by using both spatial separation and signal separation to prevent interference between satellites.

Spatial separation prevents interference by requiring a minimum spacing between satellites. As mentioned above, this spacing is typically measured in degrees of angular spacing and varies depending on the technology of the satellite communications system. In the North/South plane of satellite track 22, the invention uses spatial separation to prevent interference between satellites traveling in a common latitudinal direction. Specifically, all satellites traveling North on satellite track 22 maintain a minimum spacing apart from each other and all satellites traveling South on satellite track 22 maintain a minimum spacing apart from each other. Referring to FIG. 2, satellites 20a to 20d are all traveling North on satellite track 22 and maintain minimum spacing apart from each other. Likewise, satellites 21a to 21d are all traveling South on satellite track 22 and maintain minimum spacing apart from each other. Using this spatial separation, satellites 20a to 20d each reuse a common portion of the frequency spectrum for communications with a ground terminal without interfering with each other. Similarly, satellites 21a to 21d each reuse a common portion of the allocated frequency spectrum for communications with a ground terminal without interfering with each other.

The North/South, or latitudinal, excursion of satellite track 22 is shown by the dimension labeled NS. The latitudinal excursion of a satellite track used for the present invention is long enough to allow the minimum spatial separation between satellites described above. Accordingly, a satellite constellation having a larger number of satellites will typically have a satellite track with a longer latitudinal excursion than that used for a satellite constellation having a smaller number of satellites. The latitudinal excursion of a satellite track is controlled by varying parameters of the corresponding geosynchronous orbit, such as inclination and eccentricity.

To prevent interference between satellites in the East/West plane of satellite track 22, the invention uses signal separation. According to one embodiment of the invention, the signal separation is achieved by dividing the allocated frequency band into two frequency sub-bands and assigning different frequency sub-bands to satellites traveling in different latitudinal directions. For example, satellites 20a to 20d, which are traveling North on satellite track 22, use a first frequency sub-band for communications with a ground terminal. In a similar manner, satellites 21a to 21d, which are traveling South on satellite track 22, use a second frequency sub-band for communications with the ground terminal. By using two different frequency sub-bands, satellites 20a to 20d do not interfere with satellites 21a to 21d regardless of spatial separation between these two groups of satellites.

To maintain the signal separation in the East/West plane, as satellites reach the North/South extremes of satellite track 22, the satellite payload switches operating modes to use the other frequency sub-band for communications. The extreme points of satellite track 22 are labeled as points A and B in FIG. 2. As each satellite reaches each of points A and B, the payload of that satellite switches operating modes and begins using a different frequency sub-band for communications. For example, when satellite 20a reaches point A on satellite track 22, satellite 20a switches from traveling North to traveling South on satellite track 22 and at the same time the payload of satellite 20a switches from using the first frequency sub-band to using the second frequency sub-band for communications. Similarly, when satellite 21d reaches point B on satellite track 22, satellite 21d switches from flying South to flying North and at the same time the payload of satellite 21d switches from using the second frequency sub-band to using the first frequency sub-band.

Using the configuration of the geosynchronous satellite communications system described above, the available capacity is substantially increased over that provided by a single geostationary satellite. Specifically, by using the eight-satellite configuration depicted in FIG. 2, the present invention increases the overall available capacity by a factor of four. This increase is obtained by the four satellites 20a to 20d reusing a first portion of the allocated frequency spectrum and the other four satellites 21a to 21d reusing the remaining portion of the allocated frequency spectrum. Further increases in capacity can be obtained by using satellite constellations of more than eight satellites.

In a preferred embodiment of the invention, the allocated frequency band is divided equally between the two frequency sub-bands. In this manner the satellites flying North utilize half of the allocated frequency spectrum and the satellites flying South utilize the other half of the allocated frequency spectrum. The invention is not limited to this configuration, however, and can be implemented using various unequal divisions of the allocated frequency spectrum.

In the embodiment described above, signal separation is achieved by dividing the allocated frequency spectrum into two different frequency sub-bands. Signal separation can also be achieved using other methods known to those skilled in the art. For example, Code-Division Multiple Access (CDMA) technology can be utilized to provide signal separation. Using CDMA, different sets of codes are assigned to satellites flying North and to satellites flying South so that satellites flying in close proximity to each other avoid causing interference. Other possible signal separation techniques include, but are not limited to, using orthogonal polarizations and using different time slots for signal transmissions.

Using signal separation to prevent interference in the East/West plane of the satellite track allows the East/West, or longitudinal, excursion of satellite track 22 to be relatively narrow. As with the latitudinal excursion, the longitudinal excursion of a satellite track is controlled by varying parameters of the corresponding geosynchronous orbit, such as inclination and eccentricity. The East/West excursion of track 22 is shown in FIG. 2 by the dimension labeled EW. The elongated shape of satellite track 22 provides significant advantages for the present invention, as described below.

Figure 3:
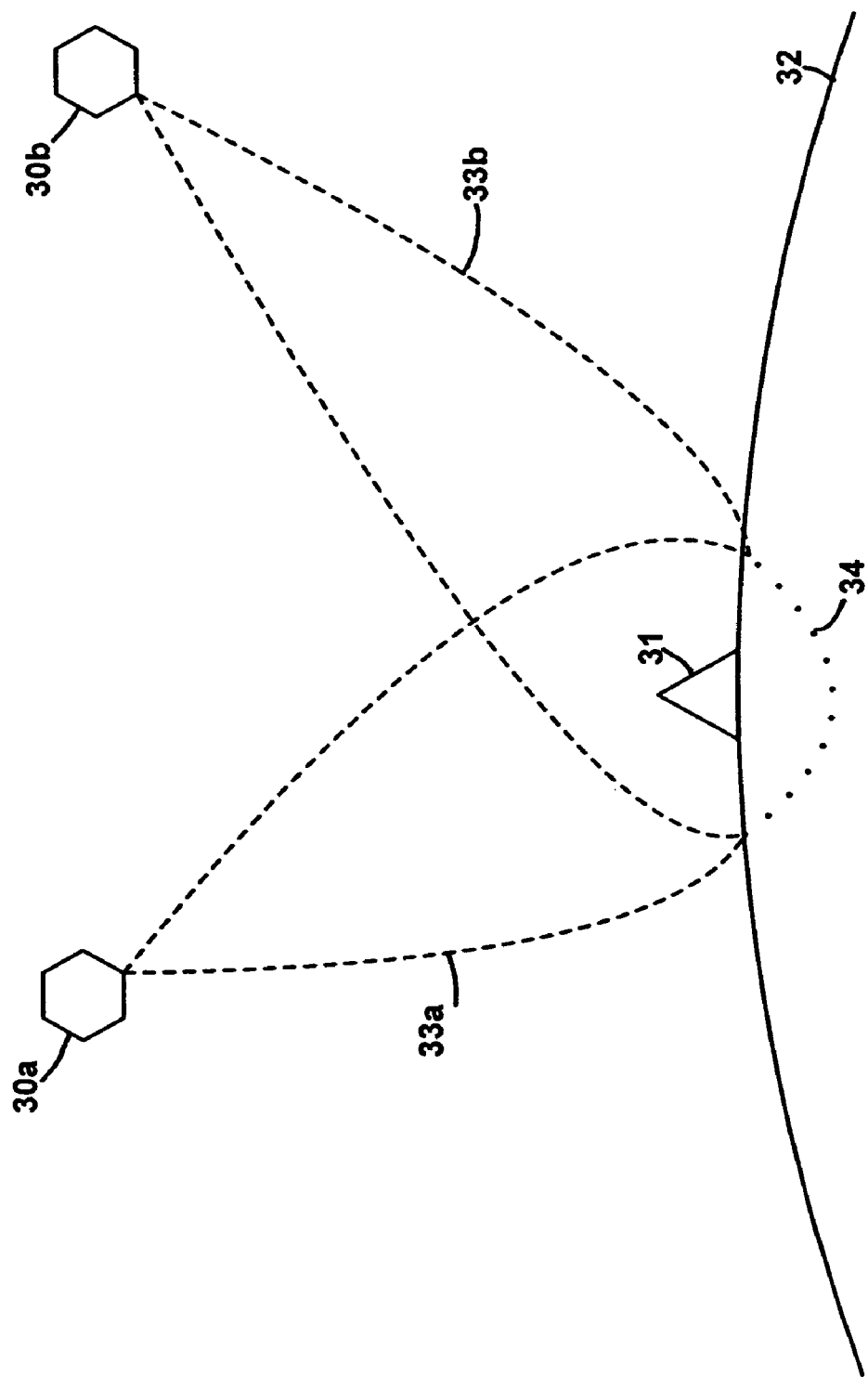
FIG. 3 is a diagram depicting the movement of a satellite and its antenna beam as the satellite travels through a satellite track.

Unlike geostationary satellites, the geosynchronous satellites of the present invention do not maintain a relatively fixed position over the surface of the Earth. As the satellites move through the satellite track of the geosynchronous orbit, both the satellites and the ground terminal must control their respective antenna beams to maintain communications. FIG. 3 is a diagram depicting the movement of a satellite and its antenna beam at two points on a satellite track.

In FIG. 3, satellites 30a and 30b represent two positions a satellite passes through on a satellite track. As the satellite moves through the satellite track, it is in communication with ground terminal 31 located on the surface 32 of the Earth. Satellites 30a and 30b have antenna beams 33a and 33b, respectively, that are used to communicate with ground terminal 31 located in service region 34. Patterns of antenna beams 33a and 33b are depicted in FIG. 3 using dashed lines. An area defining service region 34 is depicted in FIG. 3 using a dotted line. The shapes and patterns depicted in FIG. 3 are provided for illustrative purposes only and are not intended to limit the scope of the invention. One skilled in the art will recognize other beam patterns and service area shapes that can be used without departing from the spirit and scope of the invention.

As a satellite moves around the satellite track, the direction and shape of service region 34 changes with respect to the satellite. To maintain communications with all ground terminals within service region 34, the antenna beam pattern is steered to maintain a footprint over service region 34. An optional feature of the invention is to shape the antenna beam pattern as it is being steered to minimize or remove the overlap of the footprint into isolation regions outside service region 34. In addition, the antenna beam pattern of the satellite may also be controlled to minimize sidelobes over any required isolation regions. The steering and shaping of the satellite's antenna pattern is accomplished using any of a number of techniques and systems known to those skilled in the art. For example, a phased-array antenna system can be used to electrically steer and shape the antenna beam pattern. Other alternatives include using a multi-beam reflector antenna or a mechanically steered antenna on the satellite to maintain the footprint over the service area.

Figure 4:
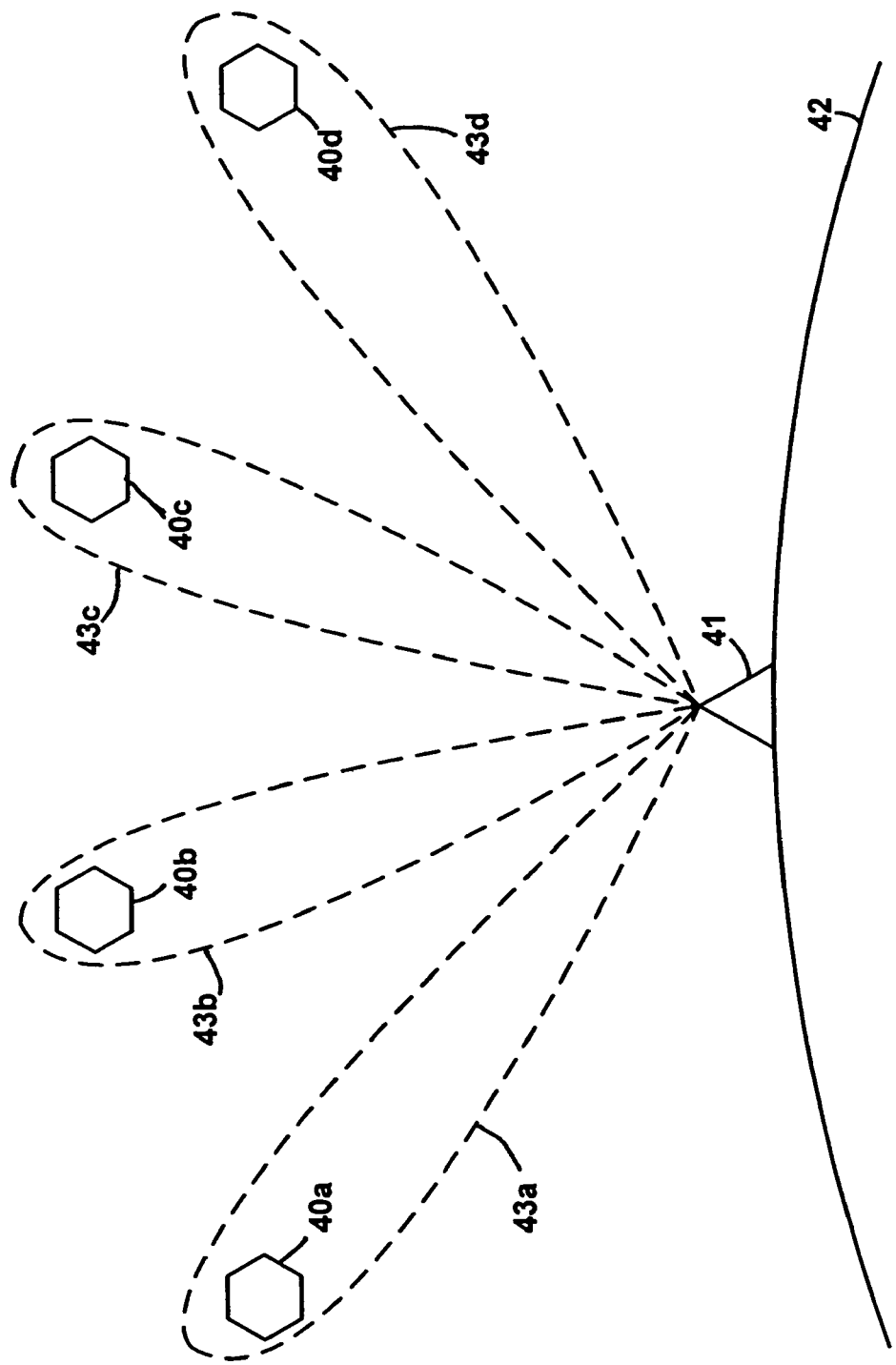
FIG. 4 is a diagram depicting the antenna beams used by a ground terminal to maintain communications with a geosynchronous satellite constellation.

FIG. 4 is a diagram depicting the antenna beams used by a ground terminal to maintain communications with a geosynchronous satellite constellation. The satellite communications system depicted in FIG. 4 includes a geosynchronous satellite constellation comprised of four satellites 40a to 40d. The satellite constellation is in communication with ground terminal 41 located on the surface 42 of the Earth. To utilize the full capacity of the satellite constellation, ground terminal 41 utilizes four antenna beams 43a to 43d to communicate with each of satellites 40a to 40d simultaneously. Patterns of antenna beams 43a to 43d are depicted in FIG. 4 using dashed lines. The patterns depicted in FIG. 4 are provided for illustrative purposes only and are not intended to limit the scope of the invention.

Unlike geostationary satellites, satellites 40a to 40d are moving through a satellite track relative to ground terminal 41. To maintain communications, antenna beams 43a to 43d are steerable antenna beams that scan with the movements of satellites 40a to 40d, respectively. Additionally, the nulls associated with each of antenna beams 43a to 43d can be steered towards one or more of the other satellites in the constellation not of interest to the particular antenna beam. Steering nulls in this manner provides another mechanism to prevent interference between satellites in the constellation. The steering of the antenna beams, and nulls, is achieved using techniques known to those skilled in the art, which include both electrically and mechanically steered and shaped antenna systems. Possible implementations include using a multi-beam antenna system or a phased-array antenna system.

In a preferred embodiment, the invention uses a geosynchronous orbit that provides an East/West excursion of its corresponding satellite track narrow enough so that ground terminal 41 only has to scan antenna beams 43a to 43d in the North/South plane to maintain communications. This is achieved by using a satellite track which keeps the East/West excursion within the usable beam width of antenna beams 43a to 43d. The usable beam width will vary depending on the design parameters and technology of the particular satellite communications system. For example, usable beam widths may include the 3 dB beam width, the 1 dB beam width or the 0.5 dB beam width. Only having to scan in one plane simplifies the antenna system, which reduces cost and improves reliability, and provides a significant advantage over conventional geosynchronous systems that require beam scanning in two planes in order to track the movement of the geosynchronous satellite. Using a narrow satellite track also allows the geosynchronous satellite constellation to occupy a single geostationary orbital location without interfering with adjacent orbital locations.

Alternative embodiments of the invention use geosynchronous orbits that provide East/West excursions of their corresponding satellite tracks that exceed the usable beam width of antenna beams 43a to 43d. In these alternative embodiments, antenna beams 43a to 43d are predominantly scanned in the North/South plane with a relatively small amount of scanning in the East/West plane to maintain communications. These alternative embodiments still provide advantages over conventional geosynchronous systems such as reduced geostationary orbital location requirements. Additionally, ground station antenna systems that provide limited antenna scanning in the East/West plane are less costly than antenna systems that provide large antenna scanning in both the East/West plane and the North/South plane.

The satellite track, and its corresponding geosynchronous orbit, depicted in FIG. 2 is only one example of a satellite track suitable for the present invention. Other satellite tracks, and corresponding geosynchronous orbits, can be used to implement the present invention so long as the characteristics of the satellite track satisfy the requirements of the invention described above. Appropriate geosynchronous orbits will be recognizable by those skilled in the art.

Alternative embodiments of the invention allow ground terminal 41 to selectively communicate with satellites 40a to 40d by steering antenna beams at particular satellites. For example, ground terminal 41 may only be authorized to receive data being transmitted by satellites 40b and 40d. In this situation, ground terminal 41 steers antenna beams 43b and 43d to scan satellites 40b and 40d, respectively, and either turns off or redirects antenna beams 43a and 43c away from satellites 40a and 40c. Additionally, the nulls of antenna beams 43b and 43d can be steered towards satellites 40a and 40c. In this manner, different communications capacities can be made available to different ground terminals within a particular service region.

Figure 5:
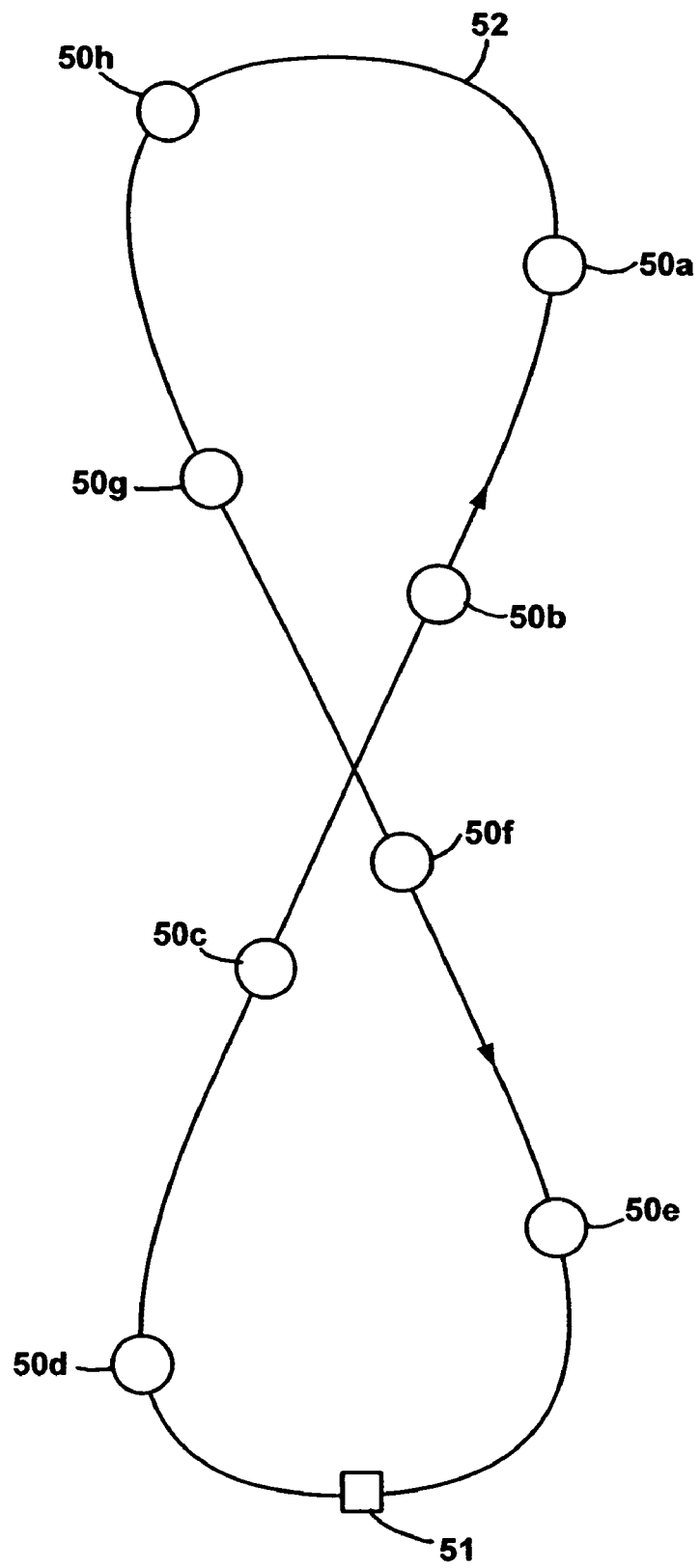
FIG. 5 is a diagram depicting a geosynchronous satellite constellation including a spare satellite.

FIG. 5 is a diagram depicting a geosynchronous satellite constellation that includes a spare satellite. As shown in FIG. 5, the satellite constellation includes eight satellites 50a to 50h and a spare satellite 51. The satellite constellation moves through a satellite track 52 in the manner described above. In the event of failure of one of satellites 50a to 50h, spare satellite 51 is moved into the position of the failed satellite. Once in position, spare satellite 51 is activated and replaces the failed satellite in the constellation. Spare satellite 51 provides redundancy to the satellite constellation that is preferred and often required for satellite communications systems without requiring a spare satellite for each satellite in the constellation. While this example only includes one spare satellite 51, other embodiments may include more than one spare satellite 51 to meet redundancy requirements of particular applications. Furthermore, spare satellites in the constellation may be used for other communications services until they are needed as replacements.

The present invention provides significant advantages over conventional satellite communications systems. Communications capacity is increased without requiring additional frequency bands or multiple geostationary orbit positions. The invention provides broader capabilities to offer different levels of communications capacity and provides cost-effective approach to satellite redundancy that is not available with geostationary satellite systems.

The foregoing detailed description of the invention is intended to illustrate preferred embodiments of the invention. However, the examples set forth above are not intended to limit the scope of the invention, which should be interpreted using the claims provided below. It is to be understood that various modifications to the illustrated examples of the invention can be made without departing from the spirit and scope of the invention.

What is claimed is:

1. A satellite constellation comprising:
a plurality of satellites traveling in a geosynchronous orbit, the geosynchronous orbit defining a satellite track,
wherein each of said plurality of satellites transmits in a first mode when traveling in a first latitudinal direction on the satellite track and transmits in a second mode when traveling in a second latitudinal direction on the satellite track, and
wherein satellites traveling in the first latitudinal direction maintain a minimum spacing apart from each other and satellites traveling in the second latitudinal direction maintain the minimum spacing apart from each other.

2. The satellite constellation according to claim 1, wherein the satellite track is an elongated satellite track.

3. The satellite constellation according to claim 2, wherein the latitudinal excursion of the satellite track is greater than the longitudinal excursion of the satellite track.

4. The satellite constellation according to claim 1, wherein the first mode of operation uses a first frequency sub-band, and the second mode of operation uses a second frequency sub-band different from the first frequency sub-band.

5. The satellite constellation according to claim 1, wherein the first mode of operation uses a first set of Code-Division Multiple Access codes and the second mode of operation uses a second set of Code-Division Multiple Access codes different from the first set.

6. The satellite constellation according to claim 1, wherein the first mode of operation uses a first polarization and the second mode of operation uses a second polarization orthogonal to the first polarization.

7. The satellite constellation according to claim 1, wherein the first mode of operation uses a first set of time slots and the second mode of operation uses a second set of time slots different from the first set.

8. The satellite constellation according to claim 1, wherein the minimum spacing is a spacing necessary to prevent interference between adjacent satellites.

9. A satellite communications system, comprising:
a plurality of satellites traveling in a geosynchronous orbit, the geosynchronous orbit defining a satellite track; and
a ground terminal for communicating with at least one of said plurality of satellites,
wherein each of said plurality of satellites transmits in a first mode when traveling in a first latitudinal direction on the satellite track and transmits in a second mode when traveling in a second latitudinal direction on the satellite track, and
wherein satellites traveling in the first latitudinal direction maintain a minimum spacing apart from each other and satellites traveling in the second latitudinal direction maintain the minimum spacing apart from each other.

10. The satellite communications system according to claim 9, wherein the satellite track is an elongated satellite track.

11. The satellite communications system according to claim 10, wherein the latitudinal excursion of the satellite track is greater than the longitudinal excursion of the satellite track.

12. The satellite communications system according to claim 9, wherein said ground terminal comprises an antenna system for selectively steering beams at said plurality of satellites.

13. The satellite communications system according to claim 12, wherein the longitudinal excursion of the satellite track is within a usable beam width of said antenna system.

14. The satellite communications system according to claim 13, wherein the longitudinal excursion of the satellite track is less than the 3 dB beam width of said antenna system.

15. The satellite communications system according to claim 13, wherein the longitudinal excursion of the satellite track is less than the 1 dB beam width of said antenna system.

16. The satellite communications system according to claim 13, wherein the longitudinal excursion of the satellite track is less than the 0.5 dB beam width of said antenna system.

17. The satellite communications system according to claim 12, wherein said antenna system steers beams in a single plane.

18. The satellite communications system according to claim 12, wherein said antenna system comprises a multi-beam reflector antenna.

19. The satellite communications system according to claim 12, wherein said antenna system comprises a multi-beam phased array antenna.

20. The satellite communications system according to claim 12, wherein said antenna system comprises a mechanically steered antenna.

21. The satellite communications system according to claim 12, wherein said antenna system selectively steers nulls at said plurality of satellites.

22. The satellite communications system according to claim 9, wherein the first mode of operation uses a first frequency sub-band, and the second mode of operation uses a second frequency sub-band different from the first frequency sub-band.

23. The satellite communications system according to claim 9, wherein the first mode of operation uses a first set of Code-Division Multiple Access codes and the second mode of operation uses a second set of Code-Division Multiple Access codes different from the first set.

24. The satellite communications system according to claim 9, wherein the first mode of operation uses a first polarization and the second mode of operation uses a second polarization orthogonal to the first polarization.

25. The satellite communications system according to claim 9, wherein the first mode of operation uses a first set of time slots and the second mode of operation uses a second set of time slots different from the first set.

26. The satellite communications system according to claim 9, wherein each of said plurality of satellites comprises a satellite antenna system for steering a beam at a service region containing said ground terminal.

27. The satellite communications system according to claim 26, wherein said satellite antenna system comprises a phased array antenna.

28. The satellite communications system according to claim 26, wherein said satellite antenna system comprises a mechanically steered antenna.

29. The satellite communications system according to claim 26, wherein said satellite antenna system comprises a multi-beam reflector antenna.

30. The satellite communications system according to claim 26, wherein said satellite antenna system shapes the beam to maintain a footprint over the service region.

31. The satellite communications system according to claim 26, wherein side lobes of the beam are steered over isolation regions.

32. The satellite communications system according to claim 9, wherein the minimum spacing is a spacing necessary to prevent interference between adjacent satellites.

33. The satellite communications system according to claim 9, further comprising a spare satellite traveling in the geosynchronous orbit for replacing a failed one of said plurality of satellites.

34. A satellite constellation comprising:
a plurality of satellites traveling in a geosynchronous orbit, the geosynchronous orbit defining a satellite track,
wherein each of said plurality of satellites operates in a first mode when traveling in a first latitudinal direction on the satellite track and in a second mode when traveling in a second latitudinal direction on the satellite track,
wherein satellites traveling in the first latitudinal direction maintain a minimum spacing apart from each other and satellites traveling in the second latitudinal direction maintain the minimum spacing apart from each other,
wherein the satellite track is an elongated track, and
wherein a latitudinal excursion of the satellite track is greater than a longitudinal excursion of the satellite track.

35. A satellite communications system, comprising:
a plurality of satellites traveling in a geosynchronous orbit, the geosynchronous orbit defining a satellite track; and
a ground terminal for communicating with at least one of said plurality of satellites,
wherein each of said plurality of satellites operates in a first mode when traveling in a first latitudinal direction on the satellite track and in a second mode when traveling in a second latitudinal direction on the satellite track, and
wherein satellites traveling in the first latitudinal direction maintain a minimum spacing apart from each other and satellites traveling in the second latitudinal direction maintain the minimum spacing apart from each other,
wherein said ground terminal comprises an antenna system for selectively steering beams at said plurality of satellites, and
wherein a longitudinal excursion of the satellite track is within a usable beam width of said antenna system.

36. The satellite communications system according to claim 35, wherein the longitudinal excursion of the satellite track is less than the 3 dB beam width of said antenna system.

37. The satellite communications system according to claim 35, wherein the longitudinal excursion of the satellite track is less than the 1 dB beam width of said antenna system.

38. The satellite communications system according to claim 35, wherein the longitudinal excursion of the satellite track is less than the 0.5 dB beam width of said antenna system.

* * * * *